F. W. LEIGHTON.
REVOLVING HAY STOWER OR SLIDE.
APPLICATION FILED AUG. 28, 1920.

1,398,437.

Patented Nov. 29, 1921.

F. W. Leighton,
Inventor
By Watson E. Coleman
Attorney

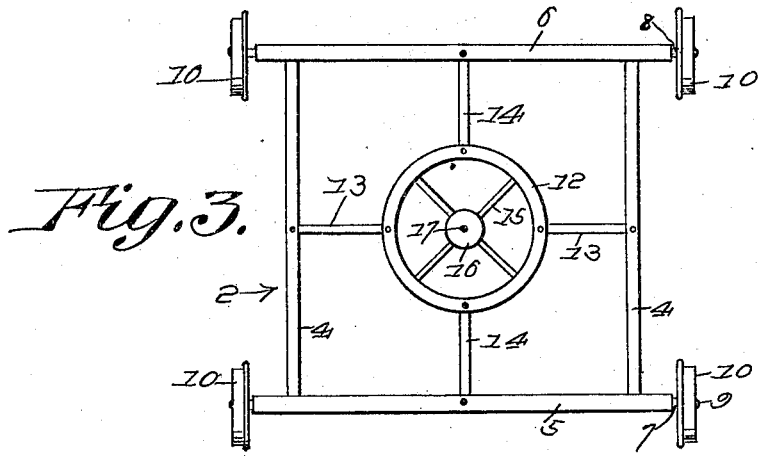
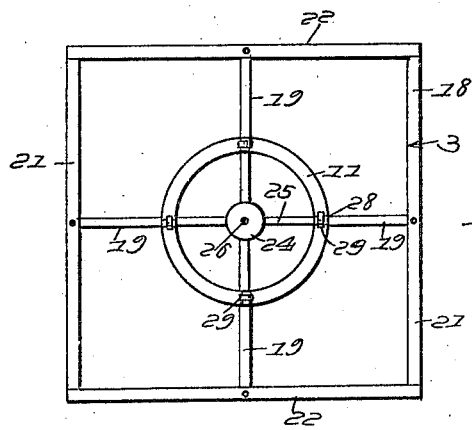
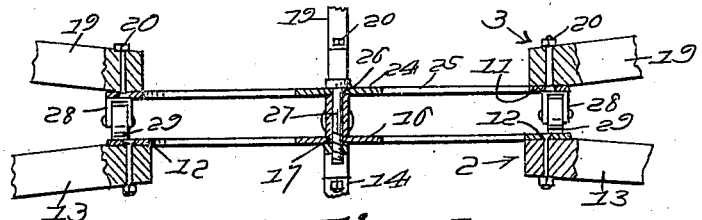

UNITED STATES PATENT OFFICE.

FRED W. LEIGHTON, OF ROCKWOOD, MAINE.

REVOLVING HAY STOWER OR SLIDE.

1,398,437.  Specification of Letters Patent.  Patented Nov. 29, 1921.

Application filed August 28, 1920. Serial No. 406,684.

*To all whom it may concern:*

Be it known that I, FRED W. LEIGHTON, a citizen of the United States, residing at Rockwood, in the county of Somerset and State of Maine, have invented certain new and useful Improvements in Revolving Hay Stowers or Slides, of which the following is a specification, reference being had to the accompanying drawings.

This invention relates to an improved hay stower, slide or guide adapted for use in connection with hay mows or lofts and especially adapted for use in connection with hay forks, the general object of the invention being to provide a device of this kind facilitating the depositing of the hay in the mow or loft so as to fill all parts thereof.

Heretofore hay forks enter the hay fork window of the mow and travel centrally through the barn and the hay is dropped or deposited in the center thereof. The hay piles up in the center, hence necessitating a workman entering the mow and pitching the hay to the sides and all corners so as to permit the mow to be properly and completely filled.

With the present invention it is the aim to avoid the depositing of the hay in the center of the mow as well as eliminating the necessity of the workman throwing the hay to all corners of the mow.

It is, therefore, another object of the invention to provide an improved slide, guide or hay stower comprising a base section and a revoluble section on which an inclined slide or hay guide is mounted whereby the revoluble section may be rotated so as to guide and deposit the hay to all parts or corners of the mow instead of permitting the hay to drop or deposit in the center.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Fig. 3 is a plan view of the lower section of the hay stower taken on line 3—3 of Fig. 2;

Fig. 4 is a bottom plan view of the upper or revoluble section taken on line 4—4 of Fig. 2;

Fig. 5 is a sectional view through the two sections of the stower showing them rotatably connected.

Figure 1:
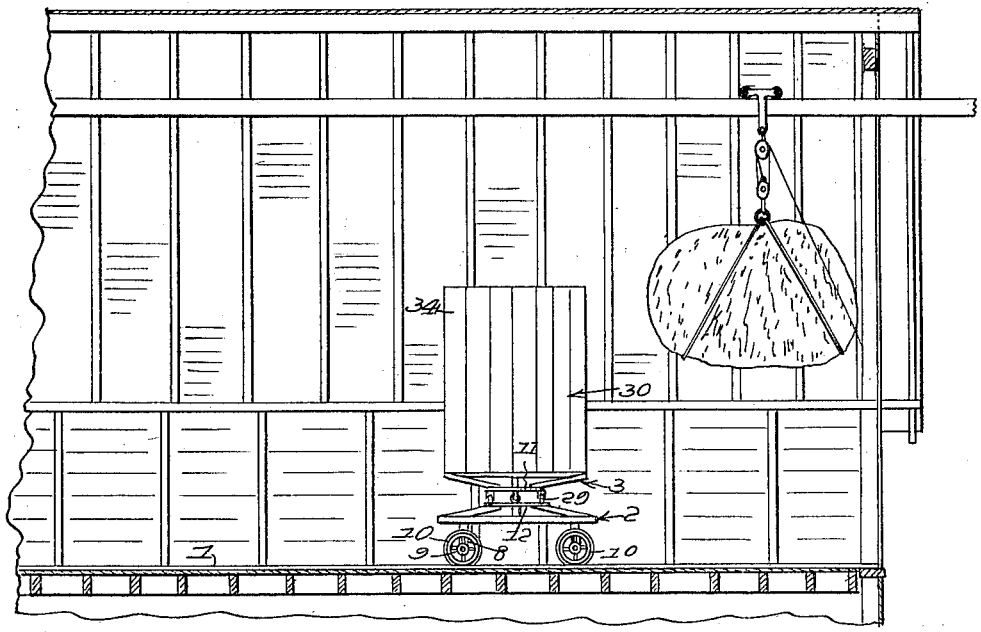
Figure 1 is a view of a hay mow and the loft of a barn showing the hay stower or guide mounted on a track passing centrally through the barn, so as to guide or chute the hay or the like to all sides and corners of the mow.
Figure 2:
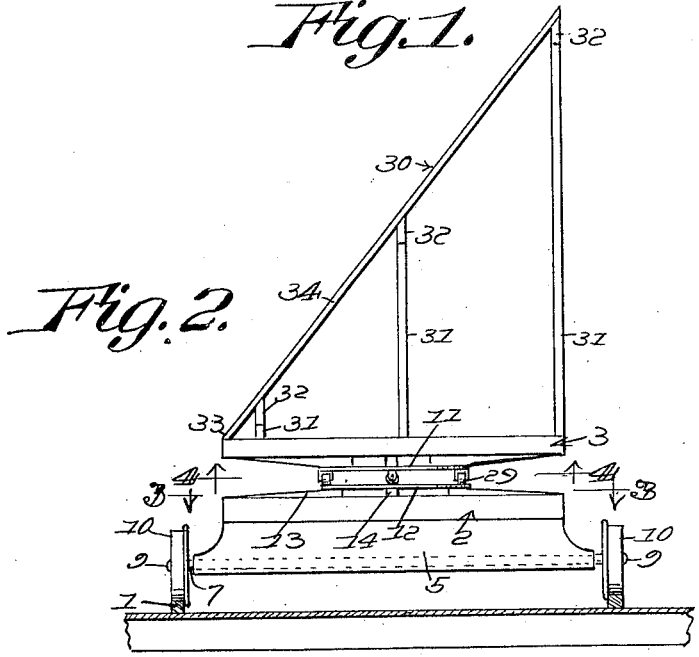
Fig. 2 is a view in elevation of the hay stower or guide at right angles to that in Fig. 1.

Referring to the drawings, 1 designates a pair of tracks which are designed to be disposed in the loft or hay mow of a barn extending through the window or hay opening of the mow and on which the improved hay stower or guide is adapted to be mounted as shown in Fig. 1. This hay stower or guide comprises the base section 2 and the revoluble section 3. The base section consists of a rectangular frame comprising the side beams 4 and the forward and rear bolsters 5 and 6. The usual form of forward and rear axles 7 and 8 are carried by the bolsters 5 and 6 and have the usual spindles 9 on which the supporting wheels 10 of the base section are mounted whereby the hay guide or stower may operate upon the rails or tracks in the hay mow.

The revoluble section is mounted to revolve on the base section through the medium of a turn table connection. The turn table connection comprises the lower annular track 12 and an upper annular section 11. The lower annular track is supported and braced relatively to the frame of the lower section of the stower or guide by means of the braces 13 and 14. The braces 13 are bolted to the track 12 and in turn secured to the side beams 4 while the braces 14 are bolted to the track 12 and in turn to the bolsters 5 and 6. These braces may assume any suitable positions preferably they are inclined upwardly toward the track 12 thereby supporting the track in a plane above the frame of the bottom section of the stower so that when the upper section of the stower is being revolved it will be free of and will not contact with the supporting wheels of the lower section of the stower. The annular track 12 has a central web comprising the spokes or radial pieces 15, which connect the track 12 and the central forward plate 16 which is provided with an opening 17.

The angular sections 11 of the turn table are reinforced relatively to the frame 18 of the revoluble section of the stower or hay guide by means of the braces 19 which are bolted to the annular section or member 11 as at 20 and in turn to the side and end pieces 21 and 22 of the frame 18 as at 23.

The annular sections 11 of the turn table connection also have a central web comprising the central plate 24 and the radial spokes 25. The central plate 24 is also provided with an opening 26 through which and through the opening 17 of the central plate 16 a suitable bolt or headed pin 27 extends, thereby connecting the two sections of the turn table whereby the upper section of the hay stower or guide may revolve so that the hay guide or chute on the revoluble section may direct or chute the hay to the different sides and corners of the hay mow.

The annular section 11 of the turn table has mounted thereon a plurality of brackets 28 having rollers or wheels 29 which travel on the track 12 thereby permitting the upper section of the hay stower to freely revolve in order to direct the hay in different directions.

Rising upwardly from the frame 18 of the revoluble section of the hay stower is a hay guide or chute 30 comprising the uprights 31 which rise from the side and end pieces 21 and 22 of the frame 18. Connecting the upper end of the uprights rising from one of the side pieces 21 of the frame 18 is a transverse bar 32 and connected to the bar 32 and inclined downwardly therefrom toward and connecting the opposite side pieces 21 of the frame 18 as at 33 are inclined pieces or boards 34 which act to guide or chute the hay to all parts of the sides and corners of the hay mow.

In the operation of this hay stower or hay guide, the hay fork is loaded with the requisite amount and allowed to travel the usual hay fork track. The hay stower as previously stated is mounted upon tracks which enter the window or opening of the hay mow under the hay fork track. The upper section of the stower is then positioned as may be desired in order to direct or chute the hay as it drops from the hay fork to all parts of the sides and ends and corners of the hay mow. The hay when released from the fork strikes approximately the center of the inclined guide boards 34 so that when the hay slides or chutes down, the hay will be thrown so as to fill all parts of the sides of the mow instead of dropping in the center as in the old method of filling hay mows or lofts.

The invention having been set forth, what is claimed as new and useful is:—

1. In a hay stower or guide for hay mows, a pair of track rails, a stower or hay guide operable thereon, said hay stower or guide comprising a base section having supporting wheels engaging the track rails, and an upper revoluble section mounted upon the base section to rotate in either direction, and an inclined hay guide mounted upon the revoluble section for guiding or chuting the hay into the sides and corners of the hay mow.

2. In a hay stower or guide, the combination with a pair of track rails, of a wheel supported frame operable on the track rails in the hay mow, a revoluble frame supported on the wheel supported frame for movement in any direction in a horizontal plane, and a hay chute on the revoluble frame and having one side rising upwardly therefrom, and an inclined portion inclined downwardly from the top of the upwardly rising portion toward one side of the revoluble frame and the horizontal plane on which the revoluble frame is rotatable, for chuting or guiding the hay to the sides and all corners and ends of the hay mow.

3. In a hay stower, the combination with a pair of track rails adapted for position in a hay mow under the hay fork, of a hay stower apparatus operable on the rails and including a revoluble section rotatable in any direction in a horizontal plane, a chute inclined from a substantial distance above the surface of the revoluble frame at one side thereof downwardly toward the opposite side thereof and at an angle to the horizontal plane in which the revoluble section is rotatable thereby acting to chute or guide the hay to all parts of the sides and corners of the hay mow.

4. In an apparatus as set forth, a pair of track rails adapted for disposition longitudinally and centrally of a hay mow under the hay fork, a frame having wheels operable on the rails whereby the frame may be adjusted centrally through the hay mow, said frame having a central raised portion, a revoluble frame having a turn table coupling with the central raised portion of the first frame, and being movable in any direction in a horizontal plane, and an inclined chute on the revoluble frame for chuting or guiding the hay to all parts of the sides and corners of the hay mow.

5. In an apparatus as set forth, a pair of track rails for disposition longitudinally of the hay mow below the hay fork, a frame having supporting wheels operable on the rails, whereby the frame may be adjusted, said frame having a central raised portion provided with a turn table section, a revoluble frame having a central depending portion including a turn table section, means for connecting the two turn table sections, anti-frictional devices between the turn table sections, said revoluble frame being rotatable in any direction in a horizontal plane, a hay chute on the revoluble frame and being inclined from a substantial distance above one side of the revoluble frame downwardly to the opposite side thereof and at an angle to the horizontal plane on which the revoluble frame is rotatable whereby a deposit of hay from a hay fork may be directed to all parts of the sides, ends and corners of the hay mow.

In testimony whereof I hereunto affix my signature.

FRED W. LEIGHTON.